United States Patent
Baumann

(10) Patent No.: US 8,109,519 B2
(45) Date of Patent: Feb. 7, 2012

(54) TUBULAR SHAFT SEAL

(76) Inventor: Hans D. Baumann, W. Palm Beach, FL (US)

( * ) Notice: Subject to any disclaimer, the term of this patent is extended or adjusted under 35 U.S.C. 154(b) by 358 days.

(21) Appl. No.: 12/586,078

(22) Filed: Sep. 17, 2009

(65) Prior Publication Data

US 2011/0062672 A1    Mar. 17, 2011

(51) Int. Cl.
*F16J 15/00* (2006.01)
(52) U.S. Cl. .............. 277/585; 251/129.18; 251/331
(58) Field of Classification Search .......... 277/500, 277/502, 504, 506–507, 584–587; 251/129.18, 251/331, 54
See application file for complete search history.

(56) References Cited

U.S. PATENT DOCUMENTS

| | | | | |
|---|---|---|---|---|
| 2,812,154 A | * | 11/1957 | Nordstrand | 251/251 |
| 3,633,869 A | * | 1/1972 | Lehmann | 251/129.18 |
| 4,609,178 A | * | 9/1986 | Baumann | 251/229 |
| 5,058,861 A | * | 10/1991 | Baumann | 251/335.3 |
| 5,284,319 A | * | 2/1994 | Baumann | 251/251 |
| 5,288,056 A | * | 2/1994 | Baumann | 251/251 |
| 5,623,962 A | * | 4/1997 | Danzy et al. | 137/469 |
| 6,752,371 B2 | * | 6/2004 | Herbert et al. | 251/54 |
| 6,948,697 B2 | * | 9/2005 | Herbert et al. | 251/129.04 |
| 2009/0242043 A1 | * | 10/2009 | Lev et al. | 137/505.25 |

* cited by examiner

*Primary Examiner* — Vishal Patel

(57) ABSTRACT

The invention describes a leak proof shaft seal for valves and other pressurized vessels, wherein the shaft seal can deform elastically by either stretching or twisting without loosing its ability to seal all, or a portion, of said shaft from harmful fluids. Furthermore, the elastic shaft seal is immune to static pressures, since it closely surrounds a shaft and thus is protected from collapse.

7 Claims, 2 Drawing Sheets

TUBULAR SHAFT SEAL

BACKGROUND OF THE INVENTION

The present invention generally relates to a device to seal shafts or stems penetrating into pressurized vessels in order to activate valves or other mechanisms and where it is desirable to seal said shafts or stems, and the opening through which said shafts or stems pass, from hazardous fluids passing or being contained within said valves or vessels.

Seals for stems heretofore employed were metal or plastic bellows, or flexible diaphragms. While bellows, as shown in my U.S. Pat. No. 5,058,861, are prone to fatigue problems, have limited excursions, and are limited to low pressures, diaphragms, as shown in my U.S. Pat. No. 4,609,178 can only be used for reciprocating stem motion, have limited excursion capabilities, are very space demanding, and are limited to relatively low pressures. They also require high actuating forces for motivation, caused by the fluid pressure acting on such a relatively large diaphragm area. This is a major cost item.

The present invention overcomes such difficulties in that a flexible tube (typically made from a rubber compound) is employed, surrounding and sealing said stems or shafts. Such a tube can easily be stretched over 100% of its original length without loosing its elasticity (depending on the material used) and is practically insensitive to fluid pressure, since the tube can not collapse, being completely supported, at the inside, by the passing stem or shaft. There is only an insignificant increase in actuating force above that caused by the fluid pressure acting on the cross-sectional area of the stem itself. The tube, besides being able to be stretched, can likewise be twisted around a shaft by more than 180 degrees thereby permitting rotary actuations.

Furthermore, my sealing device is very compact since it requires an opening within a valve or vessel that is only slightly larger than the shaft or stem itself. This is a major cost improvement over current, state of the art, devices.

Finally, the manner of sealing the upper and the lower terminal ends of my tubular seal avoids the entrapments of poisonous matter or of micro-organisms.

SUMMARY OF THE INVENTION

The invention relates to sealing devices for shafts in rotary devices manipulators, or reciprocating valve stems that require seals in order to prevent fluid from escaping from a fluid filled vessel into the open. The invention consists of a tubular member passing over that portion of a stem or shaft normally exposed to fluid, wherein one end of said tubular member is sealed and fixed onto an opening within a pressurized vessel or container, and wherein the other end is sealed and fixed against the movable shaft or stem, thus allowing for the longitudinal or rotary excursion of the stem within a fluid filled device. My invention furthermore has a wedging mechanism to achieve both the sealing as well as the retention of the aforementioned ends of the tubular member.

BRIEF DESCRIPTION OF THE DRAWINGS

The drawings illustrate preferred modes of construction. In the drawings.

DETAILED DESCRIPTION OF THE PREFERRED EMBODIMENT

Figure 1:
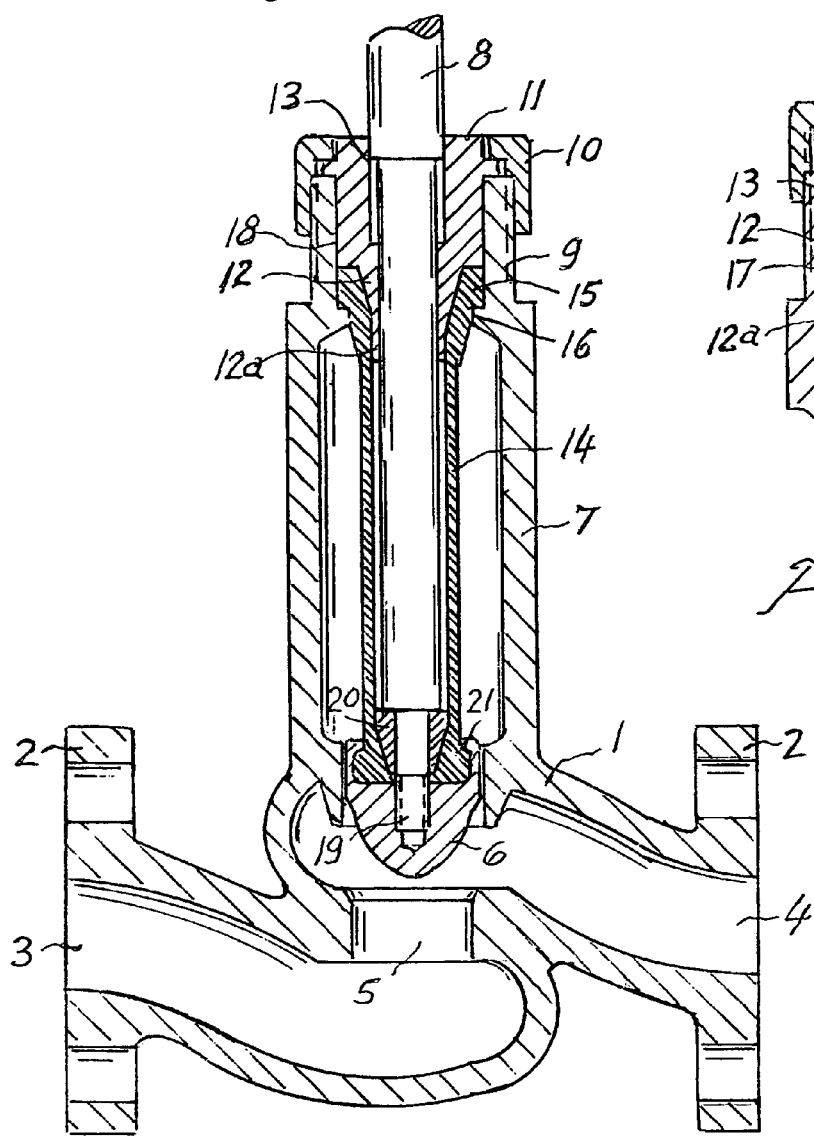
FIG. 1 is a sectional view of a globe valve having a reciprocating stem seal.
Figure 2:
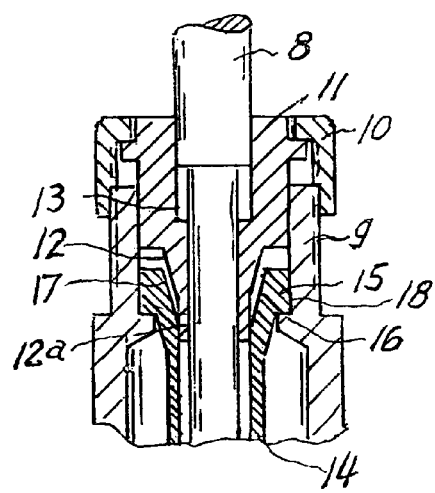
FIG. 2 is a sectional, partial view of the top portion of the device shown in FIG. 1, with the upper sealing mechanism shown prior to being compressed.
Figure 3:
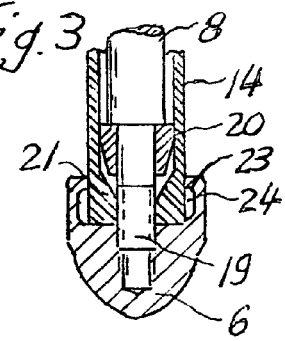
FIG. 3 is sectional, partial view of the lower portion of the device of FIG. 1, with the sealing mechanisms shown prior to being compressed.

FIG. 1 illustrates my invention as part of a conventional globe valve, comprising a housing 1 having flanged ends 2 capable of connecting an inlet port 3 and an outlet port 4 to a pipeline. An orifice 5 straddling the inlet and outlet ports co-operates with a valve plug herein after called "shaft extension" 6, here shown in the open position. Housing 1 furthermore has a tubular extension 7 incorporating therein a slid able valve shaft 8.

Said tubular extension 7 has an upper threaded, terminating portion 9, engaging therewith a threaded cupped nut 10 capable of compressing a slid able bonnet 11 made from metal or a hard plastic and having a lower convex conical section 12 and a tubular appendix 12a. Bonnet 11 and cupped nut 10 have a central, circular bore 13 to guide shaft 8.

Shaft 8 is enveloped, along a portion which extends into the portion of housing 1 which is subjected to fluid pressure by a tubular element defining a shaft seal 14. Said tubular element has an upper sealing portion 15 resting on a stepped shoulder 16 being part of tubular extension 7. Sealing portion 15 furthermore has a concave, conical section 17 able to receive the lower, conical section 12 of bonnet 11.

A tightening of nut 10 will drive bonnet 11 down and force convex section 12 to engage and compress the upper sealing portion 13 against the stepped shoulder 16 and radially outwards against wall 18 thereby providing a leak proof seal against a pressurized fluid. Tubular appendix 12a is interspaced between the compressed upper sealing portion 15 and the movable shaft 8 in order to prevent friction caused by the swelling of upper sealing portion 15, that could impede the smooth motion of shaft 8.

The lower terminating end of shaft 8 has a threaded, reduced diameter portion 19 engaging a tubular, conical ring 20 and furthermore engaging a conical portion 21 of the tubular element, made of a deformable material such as rubber. The lower end of the reduced diameter portion 19 threadingly engages a shaft extension 22 (a valve plug, in the example shown) having an upper, enlarged recess 23, encompassing a radial groove 24 engaging therein the lower, terminating part of tubular element 14 together with conical portion 21.

Any tightening of the reduced diameter portion 19 into the shaft extension 6 forces conical ring 20 to engage conical portion 21 and thereby radially deform the latter, thereby forcing the lower portion of the tubular member 14 to expand into groove 24 thus providing an effective fluid seal and means to retain the shaft seal from being pulled out of groove 24.

Shaft extension 6 will approach and close orifice 5 whenever shaft 8 is being extended downwards. Tubular member 14 has to stretch (being made of an elastomeric material) following any excursion of shaft 8 since being restrained both on top, by stepped shoulder 16, and on the bottom by groove 24. This prevents fluid from contacting the surfaces of shaft 8 or, more importantly, from escaping between shaft 8 and bore 13 to the exterior of housing 1.

Figure 4:
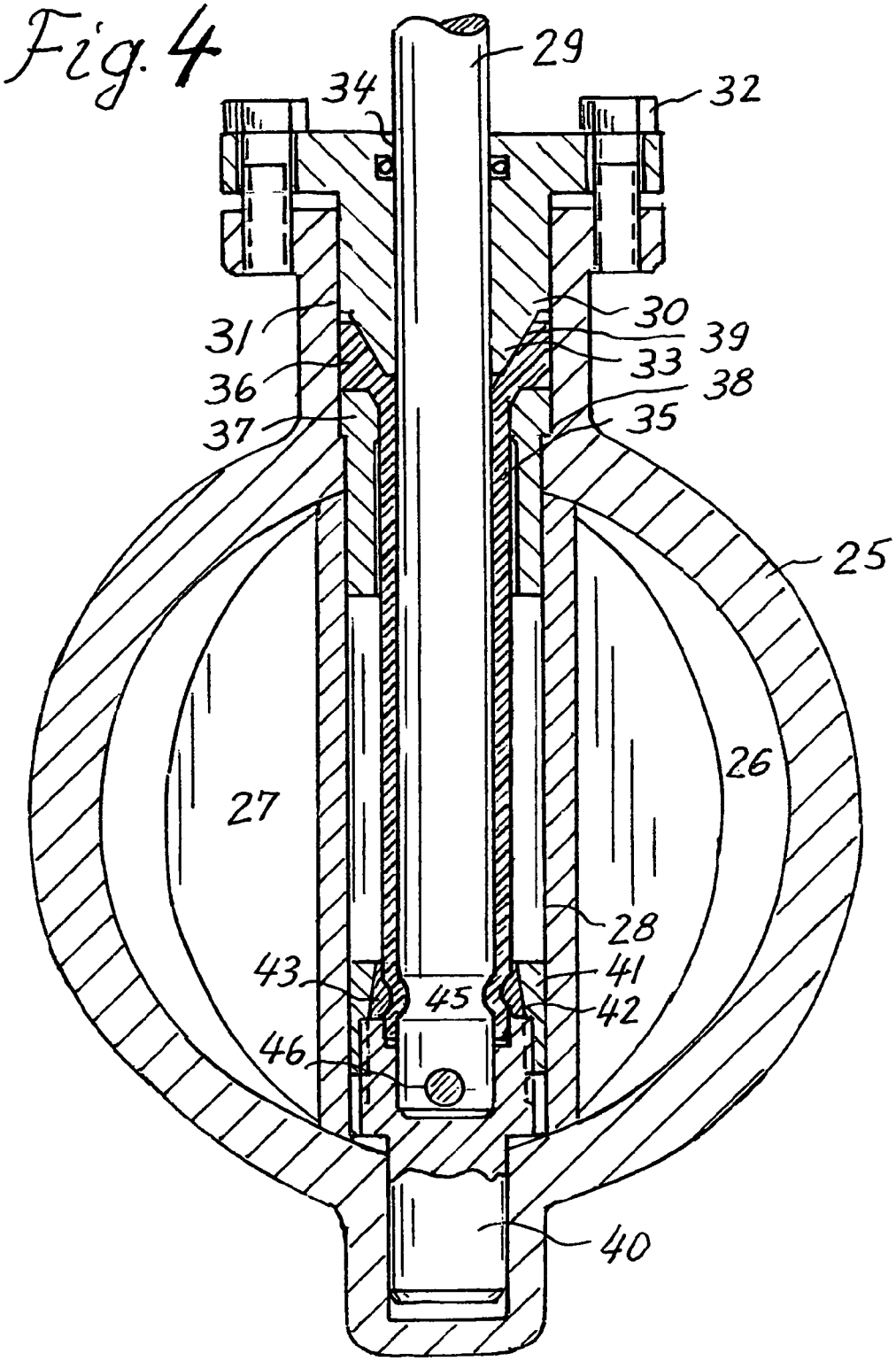
FIG. 4 is a sectional view of a butterfly valve, showing the vane in the partially open position.

A second, preferred application of my invention is illustrated in FIG. 4 showing a butterfly valve constituting a pressure vessel, and shown in a partially open position. Here a housing 25 has a circular bore 26 enclosing therein a vane 27 having a cross-sectional bore 28 retaining therein a shaft 29 extending to the exterior of housing 25.

Bore 28 is subjected to fluid pressure emanating from housing bore 26. A bonnet 30 extending through an opening 31 in housing 25 is adjustably connected to housing 25 by a pair of screws 32. Bonnet 30, made from metal or a hard plastic, has a lower convex conical section 33. Bonnet 30, furthermore has a central circular bore 34 to guide shaft 29.

Shaft 29 is enveloped, along a portion which extends into the interior portion of vane 27 which is subjected to fluid pressure, by a tubular element 35. Said tubular element has an upper sealing portion 36 resting on a guide bushing 37 supported in turn by a stepped shoulder 38 at the upper end of bore 28. Sealing portion 36 furthermore has a concave, conical section 39 able to receive the lower, convex section 33 of bonnet 30.

A tightening of screws 32 will drive bonnet 30 down and force convex section 33 to engage and compress the upper seating portion 36 against the guide bushing 37 and radially outwards against the wall of bore 31 thereby providing a leak proof seal against a pressurized fluid.

The lower terminating end of shall 29 has a threaded, enlarged diameter extension 40 engaging a tubular threaded member 41 having a concave reduced diameter portion 42 and furthermore engaging a conical ring 43 made of a deformable material such as rubber. The portion of the shaft 29 next to the enlarged diameter extension 40 has an external circumferential groove 45.

Any tightening of the enlarged diameter extension 40 forces the concave diameter portion 42 to engage conical ring 43 and thereby radially deform the latter, thereby forcing the lower portion of the tubular member 35 to contract into groove 45, thereby providing an effective fluid seal and means to retain the shall seal from being pulled or twisted out of groove 45.

Any rotary motion of shaft 29 in turn motivates vane 27 via a pin 46 and will result in a twisting of said tubular member 35 without subjecting the exterior of housing 25 to fluid leakage. While shaft 29 is turning, upper seal 36 and bushing 37 remain stationary, while lower seal 43, extension 40 together with vane 27 rotate.

While the invention has been shown in preferred embodiments, numerous modifications can be made without departing from the spirit and intent of my invention. For example, rather than being compressed by a nut, my bonnet could be threaded within the tubular extension of the housing, and then screwed down to effect the seal. In addition, it might be desirable to have the shaft undergo a combined longitudinal and rotary motion.

It may also be desirable to have the shaft's outer surface coated with a suitable lubricant in order to reduce friction between the shaft and the interior of the tubular member.

While it is preferred to have the upper and the lower sealing portions being integral parts of the tubular member, it is recognized, that these parts could be separate and being later joined either by friction or by being joined upon application of a suitable glue.

The invention claimed is:

1. A tubular shaft seal assembly, comprising a deformable tubular element partly located within a fluid containing vessel having at least one opening with an inside wall, said tubular element having an upper and one lower sealing portion on either end respectively, a movable shaft, a portion of which being surrounded by said tubular element and wherein the lower sealing portion is attached and sealed to one part of said shaft, or an extension thereof, whereas the upper sealing portion is sealed and attached to said opening of said fluid containing vessel, wherein said tubular shaft seal is capable of shielding a portion of said movable shaft penetrating within said fluid containing vessel from any contact with said fluid, said fluid containing vessel has an upper opening retaining therein an adjustable bonnet having a central bore allowing the passage of said shaft and furthermore having a convex conical section capable of engaging a concave conical opening within said upper sealing portion of said tubular element, said convex conical section being retained by a stepped shoulder within said upper opening, and wherein said bonnet is capable of tightly engaging the convex conical section into said concave conical opening thereby forcing said upper sealing portion into a tight sealing engagement with said stepped shoulder of said upper opening, said movable shaft has a lower terminating end having a stepped shoulder and a reduced, threaded, diameter portion engaging a shaft extension having an opening having an enlarged groove, receiving therein the lower end of said tubular element having a reduced internal diameter portion, a conical member placed inside the end of said tubular element and between the stepped shoulder of said shaft and the reduced diameter portion of said tubular element near the bottom of said opening within the shaft extension and wherein said threaded diameter portion being capable of forcing the lower portion of said tubular element to be radially spread to engage the grooved portion of the concave opening of said shaft extension and thereby preventing fluid from entering said concave opening.

2. A tubular shaft seal assembly as in claim 1, wherein said shaft is capable of performing a reciprocating motion by stretching said tubular element between the lower sealing portion attached to the shaft, or an extension thereof, and the upper sealing portion, attached to an opening within said fluid containing vessel.

3. A tubular shaft seal assembly as in claim 1, wherein said shaft has said reduced diameter portion and wherein said bonnet furthermore has a tubular appendix spaced close to the convex conical section and between the reduced diameter portion of said shaft and the bore of said tubular element, capable of shielding the movable shaft from rubbing against a portion of the compressed upper retained sealing portion of the tubular element.

4. A tubular shaft seal assembly as in claim 1, wherein said adjustable bonnet is motivated towards said concave conical section of the upper sealing portion via a threaded nut engaging a similarly threaded portion, being part of said fluid containing vessel.

5. A tubular shaft seal assembly as in claim 1, wherein said adjustable bonnet is motivated towards said concave conical section of the upper sealing portion via a bolted flange engaging a similar flanged portion being part of said fluid retaining vessel.

6. A tubular shaft seal assembly as in claim 1, wherein said shaft is capable of performing a rotary motion by twisting said tubular element between the lower sealing portion attached to the shaft, or an extension thereon, and the upper retained sealing portion, attached within an opening of said fluid containing vessel.

7. A tubular shaft seal assembly as in claim 1, wherein said movable shaft has an enlarged diameter terminating extension having a threaded portion, a retaining nut straddling the tubular element and engaging the threaded portion of said terminating extension, said retaining nut furthermore has an interior conical recess able to compress a complimentary shaped ring and thereby force a portion of said tubular element to tightly engage said shaft.

* * * * *